US012784666B2

(12) United States Patent
Jung et al.

(10) Patent No.: US 12,784,666 B2
(45) Date of Patent: Nov. 3, 2026

(54) METHOD FOR DRIVING DISPLAY DEVICE AT LOWER POWER AND DISPLAY DRIVER IC USING THE SAME

(71) Applicant: SAPIEN SEMICONDUCTORS INC., Seongnam-si (KR)

(72) Inventors: Dae Young Jung, Sengnam-si (KR); Geun Taek Lee, Sengnam-si (KR); Jong Gu Jeon, Sengnam-si (KR)

(73) Assignee: SAPIEN SEMICONDUCTORS INC., Seongnam-si (KR)

( * ) Notice: Subject to any disclaimer, the term of this patent is extended or adjusted under 35 U.S.C. 154(b) by 0 days.

(21) Appl. No.: 19/344,176

(22) Filed: Sep. 29, 2025

(65) Prior Publication Data

US 2026/0112309 A1 Apr. 23, 2026

(30) Foreign Application Priority Data

Oct. 18, 2024 (KR) ........................ 10-2024-0142604
Dec. 20, 2024 (KR) ........................ 10-2024-0192845

(51) Int. Cl.
*G09G 3/32* (2016.01)

(52) U.S. Cl.
CPC ........... *G09G 3/32* (2013.01); *G09G 2310/08* (2013.01); *G09G 2320/041* (2013.01); *G09G 2320/0626* (2013.01); *G09G 2330/021* (2013.01); *G09G 2360/16* (2013.01)

(58) Field of Classification Search
None
See application file for complete search history.

(56) References Cited

U.S. PATENT DOCUMENTS 10,210,792 B2 2/2019 Drzaic
11,847,986 B2 * 12/2023 Kim ..................... G09G 3/2077
11,869,415 B2 * 1/2024 Kim ................... H03K 17/6871
11,869,420 B2 * 1/2024 Mou .................... G09G 3/3208
11,967,290 B2 * 4/2024 Chappalli ............ G09G 3/2092
12,322,351 B2 * 6/2025 Kim ..................... G09G 3/3426
(Continued)

FOREIGN PATENT DOCUMENTS

KR 10-2015-0029763 A 3/2015
KR 10-2023-0106060 A 7/2023

OTHER PUBLICATIONS

KR Office Action dated May 28, 2025 as received in Application No. 10-2024-0192845.

*Primary Examiner* — Parul H Gupta
(74) *Attorney, Agent, or Firm* — Maschoff Brennan

(57) ABSTRACT

There is provided a method for driving a display device at low power. The method includes steps of: (a) a display power controller determining an allowable power value for driving the display device according to a predetermined condition; and (b) in case a present power value due to a driving of the display device is greater than the allowable power value, the display power controller performing at least one of (i) a 1-st driving current control sub-process of reducing a 1-st bias current supplied to a display panel of the display device to a 2-nd bias current corresponding to the allowable power value, (ii) a 2-nd driving current control sub-process of reducing an on-duty time of a PWM for driving LEDs of the display panel, and (iii) a 3-rd driving current control sub-process of performing at least one of BC and ACL which correspond to the video data.

15 Claims, 9 Drawing Sheets

(56) References Cited

U.S. PATENT DOCUMENTS

| | | | | |
|---|---|---|---|---|
| 2012/0299891 | A1 | 11/2012 | Fujiwara et al. | |
| 2020/0312231 | A1* | 10/2020 | Hussell | G09G 3/2096 |
| 2021/0043821 | A1* | 2/2021 | Hussell | G09G 3/2085 |
| 2021/0201769 | A1* | 7/2021 | Morris | G02B 27/0081 |

* cited by examiner

METHOD FOR DRIVING DISPLAY DEVICE AT LOWER POWER AND DISPLAY DRIVER IC USING THE SAME

CROSS REFERENCE OF RELATED APPLICATION

This present application claims the benefits of the earlier filing dates of Korean provisional patent application No. 10-2024-0142604, filed on Oct. 18, 2024, and Korean non-provisional patent application No. 10-2024-0192845, filed on Dec. 20, 2024, the entire contents of which being incorporated herein by reference.

FIELD OF THE DISCLOSURE

The present invention relates to a method for driving a display device at low power so as to reduce power consumption according to a display environment of the display device, to thereby maintain a display performance, and relates to a display driver IC using the same.

BACKGROUND OF THE DISCLOSURE

With a development of an electronic technology, various electronic products such as smart phones, tablet PCs, wearable devices, etc., that include display devices are being developed and distributed.

In these electronic devices, power consumption of the display devices accounts for the largest portion of total power consumption, and as sizes of the display devices increase, the power consumption of the display devices also increases.

However, since a capacity of a battery that supplies driving power to an electronic device is limited, various studies and developments are continuously in progress to reduce the power consumed by a display device.

For example, in the past, in order to reduce the power consumption of the display device, an ACL (i.e., Automatic Current Limitation) technique was used to control a brightness of the display device. The ACL technique is based on an idea that unnecessary power consumption may be reduced by lowering the brightness (i.e., luminance) on a bright display screen to a level that human eyes cannot distinguish. According to the ACL technique, an average value of RGB brightness values may be calculated with reference to an OPR (i.e., On Pixel Rate) of a single frame screen displayed on the display device, and then, when the average brightness is above a certain level of brightness, lowers the brightness within a range that is difficult for the human eyes to recognize, thereby allowing the unnecessary power consumption to be reduced.

However, the conventional ACL technique requires a video data adjustment, which complicates a circuit configuration and causes a screen delay equivalent to a time it takes to adjust the video data. Furthermore, as a screen resolution increases, an input cycle of the video data rapidly increases. However, since regenerated video data is immediately applied to the pixel circuit, a gradual brightness adjustment is impossible, allowing a viewer to experience discontinuous screen changes.

Meanwhile, the conventional display device controls the brightness of the display screen according to an ambient light, and in particular, a portable display device that is widely used in outdoors increases the brightness of the display screen according to the bright ambient light so that a viewer can recognize the display screen.

However, if the brightness of the display screen is increased according to the ambient light in this way, not only will the power consumption of the display device increases, but there is also a problem of increasing a temperature of the display device.

SUMMARY OF THE DISCLOSURE

It is an object of the present disclosure to solve all the aforementioned problems.

It is another object of the present disclosure to reduce power consumption while maintaining a display performance by comprehensively managing a display driving current according to a display environment of a display device.

It is still another object of the present disclosure to reduce the power consumption of the display device while maintaining the display performance by an integrated control of a bias current, video data, and a PWM (i.e., Pulse Width Modulation) duty related to a driving current control of the display device.

It is still yet another object of the present disclosure to reduce the power consumption of the display device while maintaining the display performance by adding a 2-nd driving current control sub-process through a PWM control and a 3-rd driving current control sub-process by using a BC and an ACL, after performing a 1-st driving current control sub-process for controlling a bias current according to the display environment of the display device.

In accordance with one aspect of the present disclosure, there is provided a method for driving a display device at low power, comprising steps of: (a) a display power controller determining an allowable power value for driving the display device according to a predetermined condition by referring to at least one of video data transmitted from a host to a display driver IC, a display brightness control signal transmitted from the host to the display driver IC, and temperature information of the display device detected from a temperature sensor; and (b) in case a present power value due to a driving of the display device is greater than the allowable power value, in order to control the present power value to be less than or equal to the allowable power value, the display power controller performing at least one of (i) a 1-st driving current control sub-process of reducing a 1-st bias current supplied to a display panel of the display device to a 2-nd bias current corresponding to the allowable power value, (ii) a 2-nd driving current control sub-process of reducing an on-duty time of a PWM (Pulse Width Modulation) for driving LEDs of the display panel, and (iii) a 3-rd driving current control sub-process of performing at least one of BC (Brightness Control) and ACL (Auto Current Limitation) which correspond to the video data.

As one example, at the step of (b), the display power controller reduces the 1-st bias current to the 2-nd bias current through the 1-st driving current sub-process, and after a preset time, while the 2-nd bias current is increased to a 3-rd bias current lower than the 1-st bias current, the display power controller reduces a driving current of the display device in a stepwise manner through at least one of the 2-nd driving current control sub-process and the 3-rd driving current control sub-process for each predetermined period, to thereby control the present power value to be less than or equal to the allowable power value.

As one example, at the step of (b), while the 2-nd bias current is increased to the 3-rd bias current, if the present power value does not become less than or equal to the allowable power value as a result of reducing the driving current of the display device in the stepwise manner by reducing the on-duty time of the PWM through the 2-nd driving current control sub-process during a 1-st period to a p-th period, the display power controller performs at least one of the BC and the ACL through the 3-rd driving current control sub-process during a (p+1)-th period to a q-th period, to thereby reduce the driving current of the display device in the stepwise manner, wherein p is an integer greater than or equal to 1 and q is an integer greater than or equal to (p+1).

As one example, at the step of (b), the display power controller reduces the on-duty time of the PWM by dividing one on-duty section of the PWM into a plurality of on-duty sections in performing the 2-nd driving current control sub-process.

As one example, at the step of (b), the display power controller controls a global bias current commonly supplied to every pixel of the display panel, controls each of sub-pixel bias currents supplied to each of R/G/B sub-pixels in each of the pixels, or controls a specific bias current supplied to specific pixels corresponding to a specific region of the display panel, in performing the 1-st driving current control sub-process.

As one example, at the step of (b), in case of controlling the specific bias current supplied to the specific pixels corresponding to the specific region of the display panel, the display power controller analyzes the video data, to thereby reduce a 1-st specific bias current supplied to 1-st specific pixels in a present frame image, wherein the 1-st specific pixels have same pixel values as those in a previous frame image, and maintain or increase a 2-nd specific bias current supplied to 2-nd specific pixels in the present frame image, wherein the 2-nd specific pixels have different pixel values from those in the previous frame image.

As one example, at the step of (b), the display power controller reduces the 1-st bias current to the 2-nd bias current by using a preset unit current value in the stepwise manner, wherein reducing the 1-st bias current to the 2-nd bias current in the stepwise manner is a result of applying each of weights according to differences between a present temperature of the display device and a target temperature of the display device to the unit current value at each step in the stepwise manner, in performing the 1-st driving current control sub-process.

As one example, the display power controller is installed within the display driver IC, performs the 1-st driving current control sub-process by controlling a bias current controller installed within the display driver IC, performs the 2-nd driving current control sub-process by controlling a control signal generator installed within the display driver IC, and performs the 3-rd driving current control sub-process by controlling an image processing unit installed within the display driver IC.

In accordance with another aspect of the present disclosure there is provided a display driver IC for driving a display device at low power, comprising: a display power controller; a bias current controller; a control signal generator; and an image processing unit; wherein the display power controller (I) determines an allowable power value for driving the display device according to a predetermined condition by referring to at least one of video data transmitted from a host to a display driver IC, a display brightness control signal transmitted from the host to the display driver IC, and temperature information of the display device detected from a temperature sensor, and (II) in case a present power value due to a driving of the display device is greater than the allowable power value, in order to control the present power value to be less than or equal to the allowable power value, performs at least one of (i) a 1-st driving current control sub-process of reducing a 1-st bias current supplied to a display panel of the display device to a 2-nd bias current corresponding to the allowable power value through the bias current controller, (ii) a 2-nd driving current control sub-process of reducing an on-duty time of a PWM (Pulse Width Modulation) for driving LEDs of the display panel through the control signal generator, and (iii) a 3-rd driving current control sub-process of performing at least one of BC (Brightness Control) and ACL (Auto Current Limitation) which correspond to the video data through the image processing unit.

As one example, the display power controller reduces the 1-st bias current to the 2-nd bias current through the 1-st driving current sub-process, and after a preset time, while the 2-nd bias current is increased to a 3-rd bias current lower than the 1-st bias current, the display power controller reduces a driving current of the display device in a stepwise manner through at least one of the 2-nd driving current control sub-process and the 3-rd driving current control sub-process for each predetermined period, to thereby control the present power value to be less than or equal to the allowable power value.

As one example, while the 2-nd bias current is increased to the 3-rd bias current, if the present power value does not become less than or equal to the allowable power value as a result of reducing the driving current of the display device in the stepwise manner by reducing the on-duty time of the PWM through the 2-nd driving current control sub-process during a 1-st period to a p-th period, the display power controller performs at least one of the BC and the ACL through the 3-rd driving current control sub-process during a (p+1)-th period to a q-th period, to thereby reduce the driving current of the display device in the stepwise manner, wherein p is an integer greater than or equal to 1 and q is an integer greater than or equal to (p+1).

As one example, the display power controller reduces the on-duty time of the PWM by dividing one on-duty section of the PWM into a plurality of on-duty sections in performing the 2-nd driving current control sub-process.

As one example, the display power controller controls a global bias current commonly supplied to every pixel of the display panel, controls each of sub-pixel bias currents supplied to each of R/G/B sub-pixels in each of the pixels, or controls a specific bias current supplied to specific pixels corresponding to a specific region of the display panel, in performing the 1-st driving current control sub-process.

As one example, in case of controlling the specific bias current supplied to the specific pixels corresponding to the specific region of the display panel, the display power controller analyzes the video data, to thereby reduce a 1-st specific bias current supplied to 1-st specific pixels in a present frame image, wherein the 1-st specific pixels have same pixel values as those in a previous frame image, and maintain or increase a 2-nd specific bias current supplied to 2-nd specific pixels in the present frame image, wherein the 2-nd specific pixels have different pixel values from those in the previous frame image.

As one example, the display power controller reduces the 1-st bias current to the 2-nd bias current by using a preset unit current value in the stepwise manner, wherein reducing the 1-st bias current to the 2-nd bias current in the stepwise manner is a result of applying each of weights according to differences between a present temperature of the display device and a target temperature of the display device to the unit current value at each step in the stepwise manner, in performing the 1-st driving current control sub-process.

In addition, in accordance with still another aspect of the present disclosure there is further provided a computer-readable recording medium for recording a computer program for executing the method of the present disclosure.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
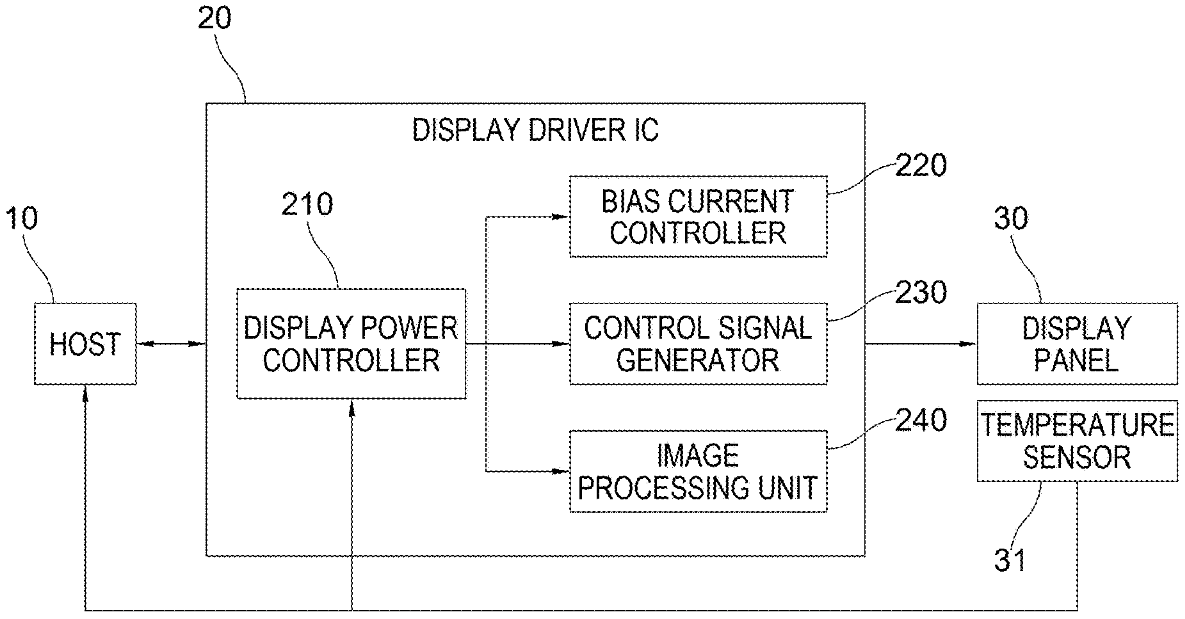
FIG. 1 is a drawing schematically illustrating a display driver IC for driving a display device at low power in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to carry out the present invention easily, the example embodiments of the present invention by referring to attached diagrams will be explained in detail as shown below.

FIG. 1 is a drawing schematically illustrating a display driver IC for driving a display device at low power in accordance with one example embodiment of the present disclosure. By referring to FIG. 1, the display driver IC 20 may include a display power controller 210, a bias current controller 220, a control signal generator 230, and an image processing unit 240.

First, the display power controller 210 is a subject that drives the display device at the low power according a display environment of the display device including the display driver IC 20 and a display panel 30, and may determine an allowable power value for driving the display device according to a predetermined condition by referring to at least one of video data transmitted from a host 10 to the display driver IC 20, a display brightness control signal transmitted from the host 10 to the display driver IC 20, and temperature information of the display device detected from a temperature sensor 31 installed at a predetermined position of the display device. The predetermined condition will be described later in conjunction with a lookup table.

In addition, in case a present power value due to a driving of the display device is greater than the allowable power value determined according to the display environment, in order to control the present power value to be less than or equal to the allowable power value, the display power controller 210 may perform at least one of (i) a 1-st driving current control sub-process of reducing a 1-st bias current supplied to the display panel 30 of the display device to a 2-nd bias current corresponding to the allowable power value, (ii) a 2-nd driving current control sub-process of reducing an on-duty time of a PWM (i.e., Pulse Width Modulation) for driving LEDs (i.e., Light Emitting Diode) of the display panel, and (iii) a 3-rd driving current control sub-process of performing at least one of a BC (Brightness Control) and an ACL (Auto Current Limitation) which correspond to the video data.

Additionally, the display power controller 210 may be installed within the display driver IC 20, but the present disclosure is not limited thereto.

Next, the bias current controller 220 for controlling the bias current supplied to the display panel 30 according to an operation of the display driver IC 20 may adjust the bias current supplied to the display panel 30 according to a 1-st driving current control signal based on the 1-st driving current control sub-process of the display power controller 210.

Thereafter, the control signal generator 230 for generating a control signal to control an operation of the display panel 30 according to the operation of the display driver IC 20 may adjust the on-duty time of the PWM for driving the LEDs, etc. of the display panel 30 according to a 2-nd driving current control signal based on the 2-nd driving current control sub-process of the display power controller 210.

Next, the image processing unit 240 for converting the video data transmitted from the host 10 into display data to be displayed on the display panel 30 according to the operation of the display driver IC 20 may adjust the display data through at least one of the BC and the ACL according to a 3-rd driving current control signal based on the 3-rd driving current control sub-process of the display power controller 210.

Meanwhile, an electronic device including the display device to which the display driver IC 20 in accordance with one example embodiment of the present disclosure is embedded may be implemented as a portable device. Examples of the portable device may include, but are not limited to, mobile phones, smart phones, smart glasses, AR (i.e., Augmented Reality) equipped devices, VR (i.e., Virtual Reality) equipped devices, MR (i.e., Mixed Reality) equipped devices, XR (i.e., Extended Reality) equipped devices, tablet PCs, PDAs (i.e., personal digital assistants), EDAs (i.e., enterprise digital assistants), digital still cameras, digital video cameras, PMPs (i.e., portable multimedia players), PNDs (i.e., personal navigation devices or portable navigation devices), handheld game consoles, e-books, wearable devices, etc.

In addition, the host 10 of the electronic device controls an overall operation of the electronic device, and may be implemented as a system on chip (i.e., SoC), an application processor (i.e., AP), a mobile AP, etc. It may transmit a video data to be displayed to the display driver IC 20.

Also, the display driver IC 20 may process the video data transmitted from the host 10 to generate the display data and then transmit the display data to the display panel 30.

Then, the display panel 30 may display a video corresponding to the display data transmitted from the display driver IC 20.

Herein, the display panel 30 may be a display panel that applies micro LEDs such as an LED (i.e., light emitting diode) display panel, an OLED (i.e., organic LED) display panel, or an AMOLED (i.e., active matrix OLED) display panel. However, for the convenience of an explanation, the following description assumes the LED.

In addition, the display panel 30 may be implemented as a display panel having in-pixel memory, wherein the in-pixel memory has at least one memory such as a random access memory (i.e., RAM), DRAM, SRAM, shift register, etc. formed in each of pixels. Also, the display panel 30 may store the display data transmitted from the display driver IC 20 in the memory and may drive each of the pixels by using the display data stored in the memory, to thereby display the video. For reference, the display panel having the in-pixel memory is described in detail in Korean Patent Registration No. 10-1942466 of the applicant of the present disclosure, therefore, a description thereof is omitted.

Figure 2:
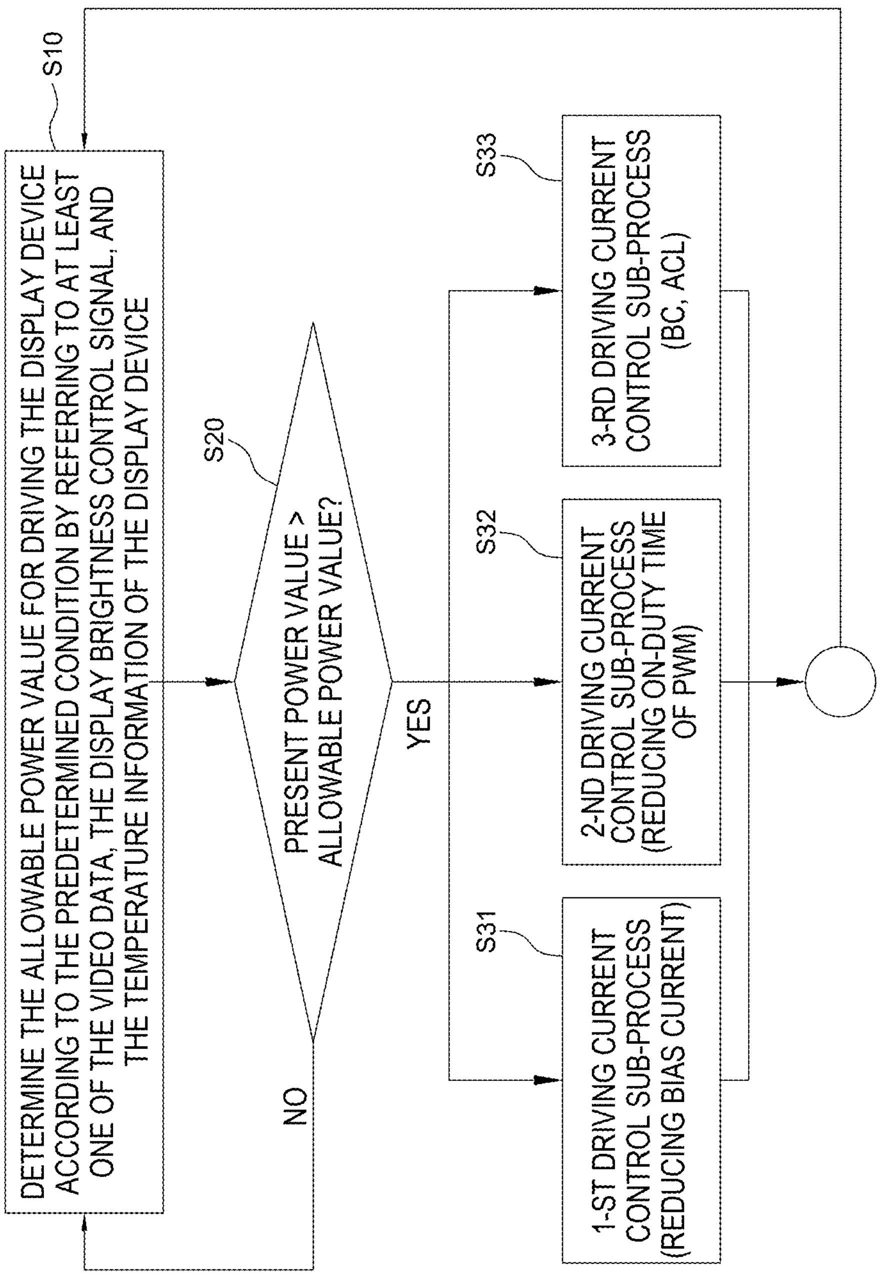
FIG. 2 is a drawing schematically illustrating a method for driving the display device at the low power in accordance with one example embodiment of the present disclosure.

A method for driving the display device at the low power by using the display driver IC 20 as above in accordance with one example embodiment of the present disclosure is described in detail with reference to FIG. 2 as follows.

First, in response to a transmission of the video data from the host 10, the display driver IC 20 of the display device may convert the video data into the display data through the image processing unit 240 and generate a control signal for driving the display panel 30 through the control signal generator 230.

Then, the display driver IC 20 may transmit the display data and the control signal to the display panel 30 while supplying the bias current to the display panel 30 through the bias current controller 220.

Thereafter, the display panel 30 may display the video by driving the LEDs, according to the display data and the control signal, which is a result of controlling the current supplied to each LED of each pixel.

In this state, the display power controller 210 may determine the allowable power value for driving the display device according to the predetermined condition by referring to at least one of the video data transmitted from the host 10 to the display driver IC 20, the display brightness control signal transmitted from the host 10 to the display driver IC 20, and the temperature information of the display device detected from the temperature sensor 31, at a step of S10. That is, the display power controller 210 may determine the allowable power value to minimize power consumption while maintaining display performance according to the display environment of the display device.

For example, the display power controller 210 may determine the allowable power value that can reduce the power consumption while maintaining the display performance by integrating factors that affect the power consumption of the display device, such as the brightness and gradation of the pixels in the video data, the brightness control signal from the host 10 for controlling display brightness according to an ambient light, and the temperature of the display device.

Herein, the display power controller 210 may use the lookup table that sets each of maximum power values for power saving while maintaining the display performance by referring to at least one of the factors affecting the power consumption of the display device, to thereby determine a specific maximum power value as the allowable power value. Herein, the specific maximum power value corresponds to one or more specific factors according to a present display environment. Of course, the present disclosure is not limited thereto, and a power value that is lower by a predetermined value than the specific maximum power value may be determined as the allowable power value, or a power value that is higher by the predetermined value than the specific maximum power value may be determined as the allowable power value.

Furthermore, when setting the maximum power values managed by the lookup table, i.e., each of the maximum power values for each of combinations of the factors affecting the power consumption, each of different weights may be applied to each factor. For example, the maximum power values can be set by using combinations whose factors include the temperature and the brightness control signal from the host with higher weights, and the brightness and the gradation of the video data with lower weights.

In this way, the lookup table may manage each maximum power value corresponding to each predetermined condition, and if the present condition corresponds to a specific condition among the plurality of predetermined conditions, the display power controller 210 may perform at least one control sub-process by referring to the specific maximum power value corresponding to the specific condition with reference to the lookup table. For example, each predetermined condition may be created by each of combinations selected among video data analysis information (i.e., the brightness value or the gradation status of the video itself), the brightness control signal status from the host, and the temperature status. However, such matching need not necessarily rely on the lookup table, but it is also possible to determine optimal allowable power values for the predetermined conditions by using a specific AI technology.

Thereafter, the display power controller 210 may check the present power value according to the operation of the display device and check whether the present power value is greater than the allowable power value at a step of S20.

Herein, if the present power value is lower than or equal to the allowable power value, the display power controller 210 may continuously monitor the display environment, and otherwise if the present power value is higher than the allowable power value, the display power controller 210 may control a display driving current so as to cause the present power value to be lower than or equal to the allowable power value at steps of S31, S32, S33.

That is, in order to control the present power value to be less than or equal to the allowable power value, the display power controller 210 may perform at least one of (i) a 1-st driving current control sub-process of reducing the 1-st bias current supplied to the display panel 30 of the display device to the 2-nd bias current corresponding to the allowable power value, i.e., the step of S31, (ii) the 2-nd driving current control sub-process of reducing an on-duty time of the PWM for driving the LEDs of the display panel 30, i.e., the step of S32, and (iii) the 3-rd driving current control sub-process of performing at least one of the BC and the ACL which correspond to the video data, i.e., the step of S33.

Figure 3:
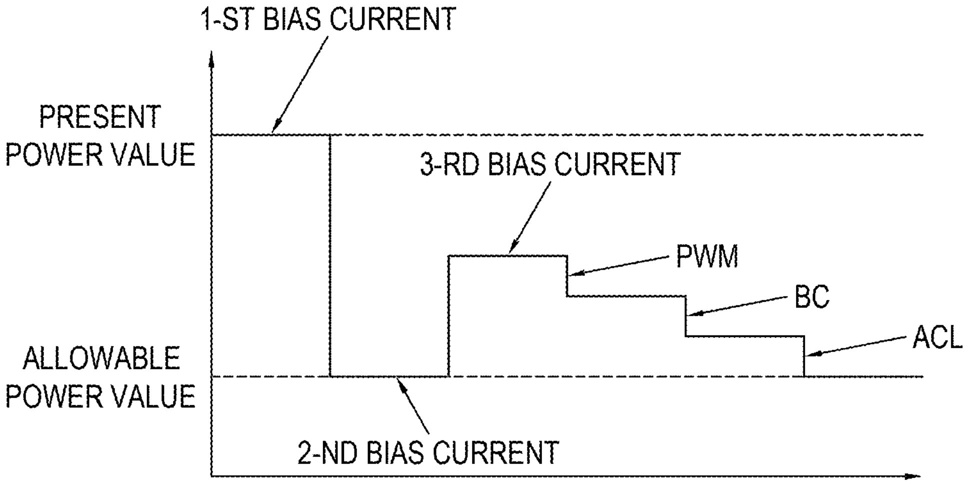
FIG. 3 is a drawing schematically illustrating an example of controlling a driving current in the method for driving the display device at the low power in accordance with one example embodiment of the present disclosure.

For example, by referring to FIG. 3, the display power controller 210 may perform the 1-st driving current sub-process to reduce the 1-st bias current at the present power value to the 2-nd bias current through the bias current controller 220 at the step of S31, and after a preset time, increase the 2-nd bias current to a 3-rd bias current lower than the 1-st bias current through the bias current controller 220. That is, the display power controller 210 may quickly lower the present power value to the allowable power value by reducing the bias current that is most effective in reducing the power consumption from the 1-st bias current to the 2-nd bias current, and may increase the bias current from the 2-nd bias current to the 3-rd bias current in order to maintain the display performance after the preset time. In particular, when the temperature of the display device is higher than a preset temperature, the temperature of the display device may be quickly lowered by reducing the bias current from the 1-st bias current to the 2-nd bias current, and when the temperature of the display device is lowered to a certain extent, that is, when the preset time has elapsed, the bias current may be increased from the 2-nd bias current to the 3-rd bias current in order to maintain the display performance.

Figure 4:
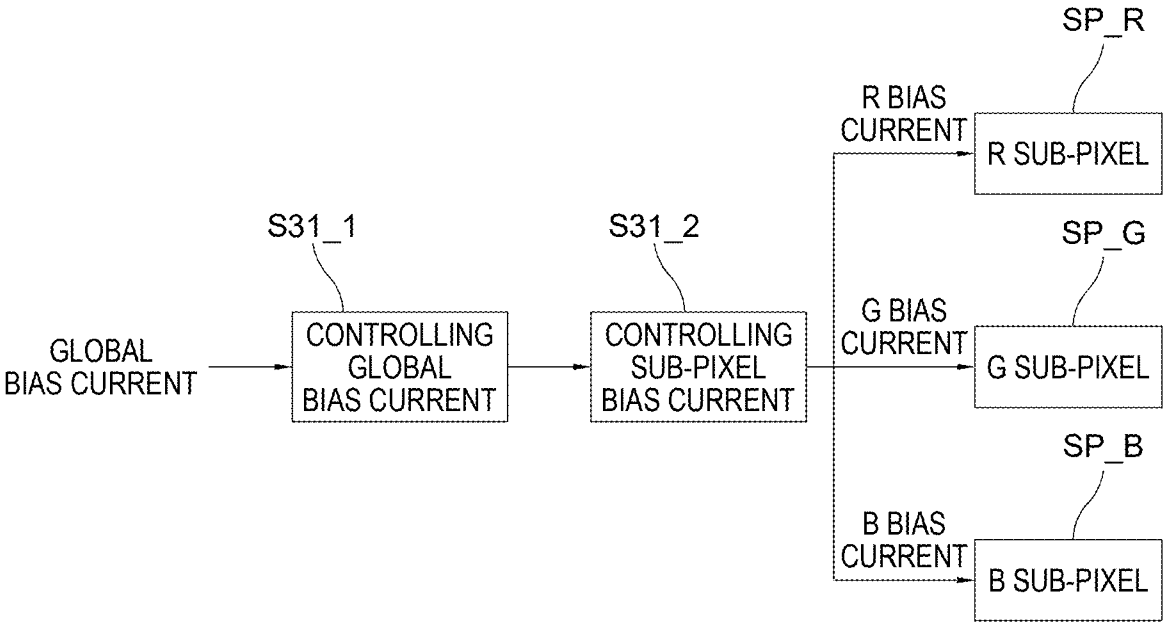
FIG. 4 is a drawing schematically illustrating an example of reducing a bias current in the method for driving the display device at the low power in accordance with one example embodiment of the present disclosure.

Herein, by referring to FIG. 4, in performing the 1-st driving current control sub-process at the step of S31, the display power controller 210 may control a global bias current commonly supplied to every pixel of the display panel at a step of S31_1, or control each of sub-pixel bias currents supplied to each of R/G/B sub-pixels (i.e., SP_R, SP_G, SP_B) in each of the pixels at a step of S31_2. In contrast, the display power controller 210 may control a specific bias current supplied to specific pixels corresponding to a specific region of the display panel 30. For example, by analyzing the video data, a 1-st specific bias current supplied to 1-st specific pixels in a present frame image may be reduced, wherein the 1-st specific pixels have same pixel values as those in a previous frame image, and a 2-nd specific bias current supplied to 2-nd specific pixels in the present frame may be maintained or increased, wherein the 2-nd specific pixels have different pixel values from those in the previous frame image.

Figure 5:
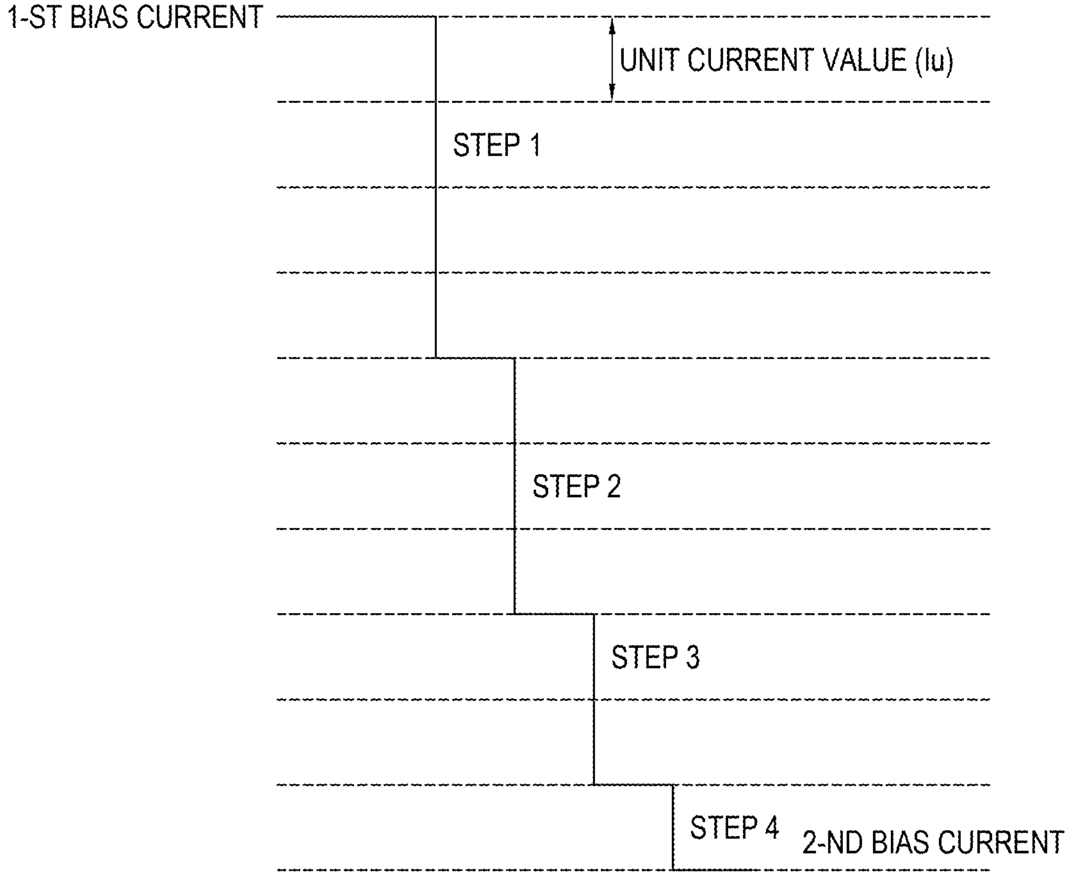
FIG. 5 is a drawing schematically illustrating a state of controlling the bias current in the method for driving the display device at the low power in accordance with one example embodiment of the present disclosure.

Also, by referring to FIG. 5, the display power controller 210 may reduce the 1-st bias current to the 2-nd bias current by using a preset unit current value Iu in the stepwise manner, in performing the 1-st driving current control sub-process at the step of S31.

Herein, the display power controller 210 may apply each of weights corresponding to each of the factors affecting the power consumption of the display device to the unit current value to thereby reduce the 1-st bias current to the 2-nd bias current at each step in the stepwise manner. For example, the bias current may be reduced by applying each of weights to the unit current value, wherein the each of weights is acquired according to each of differences between a present temperature of the display device and a target temperature of the display device, thereby preventing the display performance from being degraded due to a rapid decrease in the bias current. For reference, FIG. 5 illustrates a state in which the 1-st bias current is reduced to the 2-nd bias current in four steps, specifically, four times of the unit current value 4*Iu is reduced in step 1, three times of the unit current value 3*Iu is reduced in step 2, two times of the unit current value 2*Iu is reduced in step 3, and the unit current value Iu is reduced in step 4, but the present disclosure is not limited thereto.

By referring again to FIG. 3, on condition that the bias current has been increased from the 2-nd bias current to the 3-rd bias current, the display power controller 210 may reduce the driving current of the display device in the stepwise manner through at least one of the 2-nd driving current control sub-process, i.e., the step of S32, and the 3-rd driving current control sub-process, i.e., the step of S33, for each preset period, so that the present power value becomes less than or equal to the allowable power value.

For example, on condition that the 2-nd bias current has been increased to the 3-rd bias current through the bias current controller 220, if the present power value does not become less than or equal to the allowable power value as a result of reducing the driving current of the display device in the stepwise manner by reducing the on-duty time of the PWM via a control of the control signal generator 230 through the 2-nd driving current control sub-process at the step of S32 during at least one period, i.e., a 1-st period to a p-th period, wherein the PWM drives the LED, the display power controller 210 may perform at least one of the BC and the ACL via a control of the image processing unit 240 through the 3-rd driving current control sub-process at the step of S33 during a (p+1)-th period to a q-th period, to thereby reduce the driving current of the display device in the stepwise manner. Herein, q may be an integer greater than or equal to (p+1). For reference, in FIG. 3, for convenience of explanation, a state is illustrated in which, after the 1-st driving current control sub-process at the step of S31, each of the on-duty time of the PWM by the 2-nd driving current control sub-process at the step of S32, the BC by the 3-rd driving current control sub-process at the step of S33, and the ACL by the 3-rd driving current control sub-process at the step of S33 is controlled for each cycle.

Figure 6A:
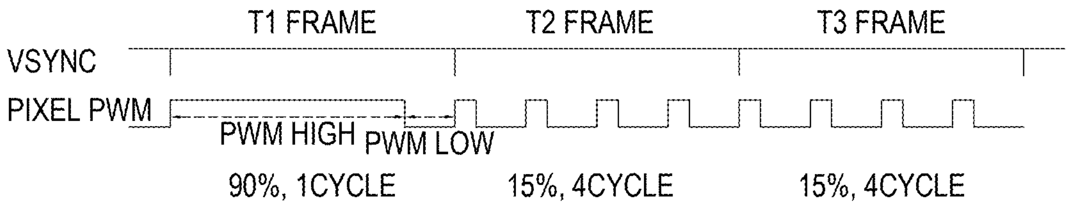
FIG. 6A and FIG. 6B are drawings schematically illustrating a state of reducing an on-duty time of a PWM in the method for driving the display device at the low power in accordance with one example embodiment of the present disclosure.

Herein, by referring to FIG. 6A, the display power controller 210 may reduce the on-duty time of the PWM by dividing one on-duty section of the PWM corresponding to the gradation of the pixel, i.e., one "high" section in the PWM, into a plurality of on-duty sections through the control signal generator 230, in performing the 2-nd driving current control sub-process at the step of S32.

For example, while driving the LED by using the PWM with one cycle occupying 90% section of a T1 frame, in order to reduce an LED driving current, after a T2 frame, the display power controller 210 may drive the LED by using the PWM with four cycles occupying 15% section. That is, by changing the on-duty time of the PWM in the T1 frame (i.e., frame time*90%) to the on-duty time of the PWM in the T2 frame (i.e., frame time*60%), the on-duty time of the PWM may be reduced, and accordingly, the LED driving current may be reduced while maintaining the display performance.

Figure 6B:
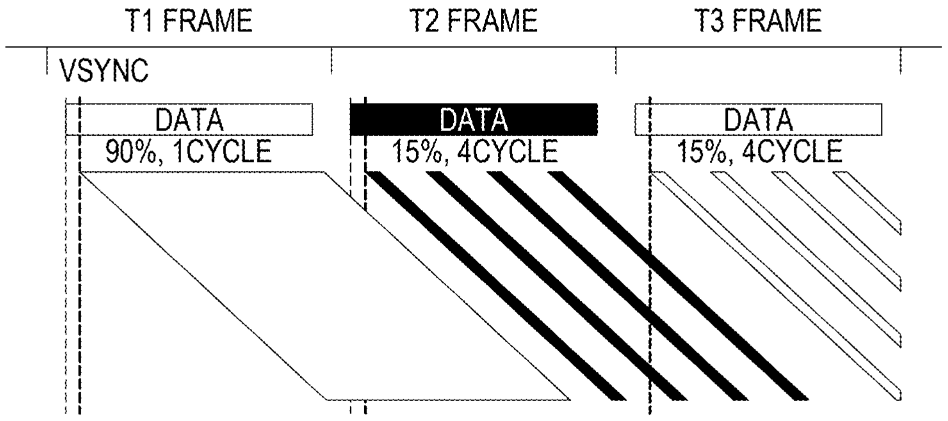

Accordingly, by referring to FIG. 6B, for the same video data, in the T1 frame, the video is continuously displayed for one cycle of the PWM having 90% of the on-duty time for the frame time, whereas in the T2 frame, the video may be displayed only for each of the four cycles of the PWM having 15% of the on-duty time for the frame time. Herein, the divided cycles may be adjusted such that time lengths of the sections in which the video is not displayed between each of the four cycles in the T2 frame, that is, the sections corresponding to the "low" section in the PWM, become time lengths in which a viewer cannot perceive changes in on/off states of the display video within a single frame.

Figure 7:
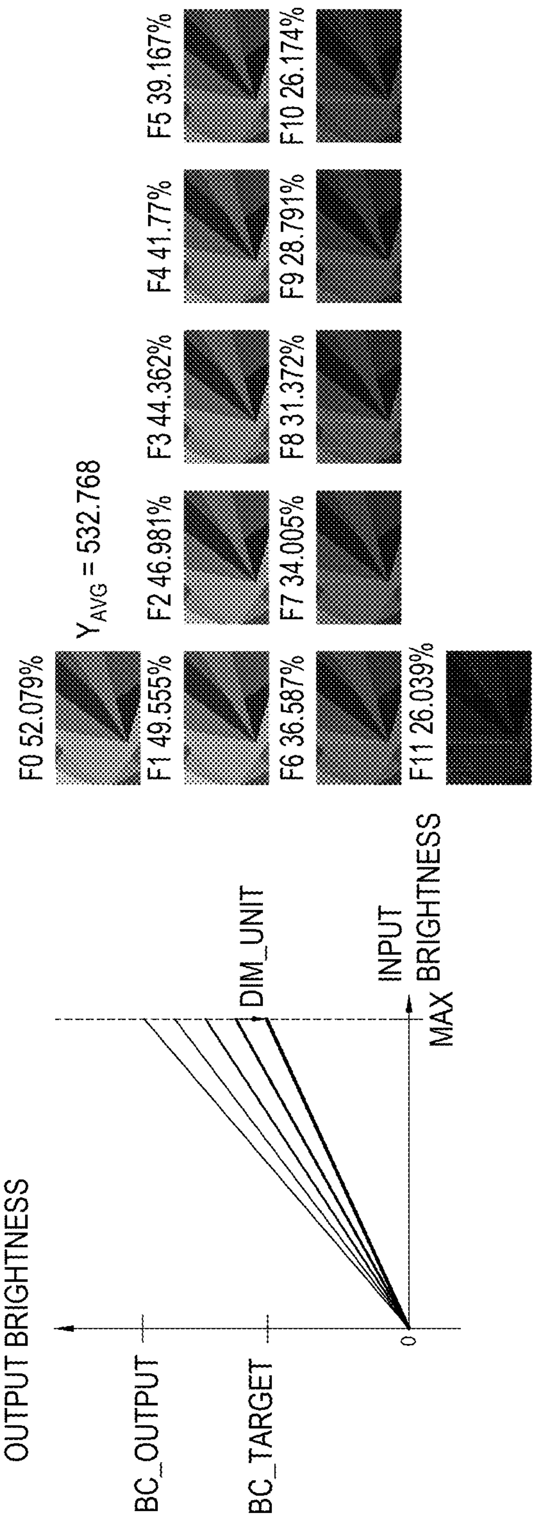
FIG. 7 is a drawing schematically illustrating a state of performing a BC in the method for driving the display device at the low power in accordance with one example embodiment of the present disclosure.

Thereafter, by referring to FIG. 7, in performing the BC of the 3-rd driving current control sub-process at the step of S33, the display power controller 210 may calculate an average brightness YAvg of the video data, and then determine a target brightness BC_target for reducing the driving current by using a unit dimming value dim_unit, and may cause the video data to be converted into the display data corresponding to a target brightness BC_target through the image processing unit 240. Accordingly, the display panel 30 may reduce the LED driving current by displaying the video with reduced brightness. For reference, FIG. 7 exemplarily illustrates that an image F0, which has an average brightness of 532,768 and a brightness corresponding to 52.079% of a maximum brightness, is dimmed in the stepwise manner by using 5% of the unit dimming value dim_unit with the target brightness being set to-50%, so that the brightness is reduced by 50% to have a brightness corresponding to 26.039% of the maximum brightness, thereby resulting in a total brightness reduction of 532*50%=266, while the average brightness may be reduced by 532*5%=26.56 at each step of the stepwise manner.

Figure 8:
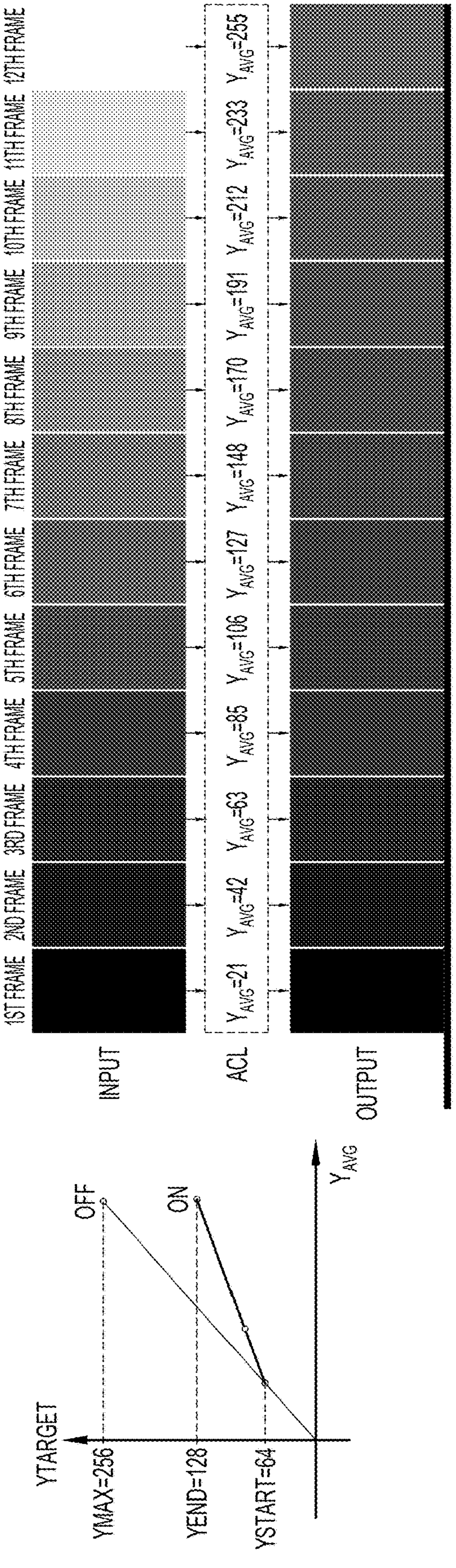
FIG. 8 is a drawing schematically illustrating a state of performing an ACL in the method for driving the display device at the low power in accordance with one example embodiment of the present disclosure.

Also, By referring to FIG. 8, in performing the ACL of the 3-rd driving current control sub-process at the step of S33, the display power controller 210 may calculate the average brightness YAvg of the video data, and then determine the target brightness in which the brightness is reduced within a range where a viewer has difficulty in perceiving a change in brightness with the naked eyes, and may convert the video data into the display data corresponding to the target brightness through the image processing unit 240. Accordingly, the display panel 30 may reduce the LED driving current by displaying the video with reduced brightness. For reference, on condition that YSTART for adjusting brightness has been set to 64 and YEND for adjusting brightness has been set to 128, with the maximum brightness Ymax being 255, FIG. 8 exemplarily illustrates a state in which the average brightness YAVG is adjusted.

The present disclosure has an effect of reducing power consumption while maintaining a display performance by comprehensively managing a display driving current according to a display environment of a display device.

The present disclosure has another effect of reducing the power consumption of the display device while maintaining the display performance by an integrated control of a bias current, video data, and a PWM (Pulse Width Modulation) duty related to a driving current control of the display device.

The present disclosure has still another effect of reducing the power consumption of the display device while maintaining the display performance by adding a 2-nd driving current control sub-process through a PWM control and a 3-rd driving current control sub-process by using a BC and a ACL, after performing a 1-st driving current control sub-process for controlling a bias current according to the display environment of the display device.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims. Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for driving a display device at low power, comprising steps of:

(a) a display power controller determining an allowable power value for driving the display device according to a predetermined condition by referring to at least one of video data transmitted from a host to a display driver IC, a display brightness control signal transmitted from the host to the display driver IC, and temperature information of the display device detected from a temperature sensor; and (b) in case a present power value due to a driving of the display device is greater than the allowable power value, in order to control the present power value to be less than or equal to the allowable power value, the display power controller performing at least one of (i) a 1-st driving current control sub-process of reducing a 1-st bias current supplied to a display panel of the display device to a 2-nd bias current corresponding to the allowable power value, (ii) a 2-nd driving current control sub-process of reducing an on-duty time of a PWM (Pulse Width Modulation) for driving LEDs of the display panel, and (iii) a 3-rd driving current control sub-process of performing at least one of BC (Brightness Control) and ACL (Auto Current Limitation) which correspond to the video data.

2. The method of claim 1, wherein, at the step of (b), the display power controller reduces the 1-st bias current to the 2-nd bias current through the 1-st driving current sub-process, and after a preset time, while the 2-nd bias current is increased to a 3-rd bias current lower than the 1-st bias current, the display power controller reduces a driving current of the display device in a stepwise manner through at least one of the 2-nd driving current control sub-process and the 3-rd driving current control sub-process for each predetermined period, to thereby control the present power value to be less than or equal to the allowable power value.

3. The method of claim 2, wherein, at the step of (b), while the 2-nd bias current is increased to the 3-rd bias current, if the present power value does not become less than or equal to the allowable power value as a result of reducing the driving current of the display device in the stepwise manner by reducing the on-duty time of the PWM through the 2-nd driving current control sub-process during a 1-st period to a p-th period, the display power controller performs at least one of the BC and the ACL through the 3-rd driving current control sub-process during a (p+1)-th period to a q-th period, to thereby reduce the driving current of the display device in the stepwise manner, wherein p is an integer greater than or equal to 1 and q is an integer greater than or equal to (p+1).

4. The method of claim 1, wherein, at the step of (b), the display power controller reduces the on-duty time of the PWM by dividing one on-duty section of the PWM into a plurality of on-duty sections in performing the 2-nd driving current control sub-process.

5. The method of claim 1, wherein, at the step of (b), the display power controller controls a global bias current commonly supplied to every pixel of the display panel, controls each of sub-pixel bias currents supplied to each of R/G/B sub-pixels in each of the pixels, or controls a specific bias current supplied to specific pixels corresponding to a specific region of the display panel, in performing the 1-st driving current control sub-process.

6. The method of claim 5, wherein, at the step of (b), in case of controlling the specific bias current supplied to the specific pixels corresponding to the specific region of the display panel, the display power controller analyzes the video data, to thereby reduce a 1-st specific bias current supplied to 1-st specific pixels in a present frame image, wherein the 1-st specific pixels have same pixel values as those in a previous frame image, and maintain or increase a 2-nd specific bias current supplied to 2-nd specific pixels in the present frame image, wherein the 2-nd specific pixels have different pixel values from those in the previous frame image.

7. The method of claim 1, wherein, at the step of (b), the display power controller reduces the 1-st bias current to the 2-nd bias current by using a preset unit current value in the stepwise manner, wherein reducing the 1-st bias current to the 2-nd bias current in the stepwise manner is a result of applying each of weights according to differences between a present temperature of the display device and a target temperature of the display device to the unit current value at each step in the stepwise manner, in performing the 1-st driving current control sub-process.

8. The method of claim 1, wherein the display power controller is installed within the display driver IC, performs the 1-st driving current control sub-process by controlling a bias current controller installed within the display driver IC, performs the 2-nd driving current control sub-process by controlling a control signal generator installed within the display driver IC, and performs the 3-rd driving current control sub-process by controlling an image processing unit installed within the display driver IC.

9. A display driver IC for driving a display device at low power, comprising:

a display power controller;

a bias current controller;

a control signal generator; and an image processing unit;

wherein the display power controller (I) determines an allowable power value for driving the display device according to a predetermined condition by referring to at least one of video data transmitted from a host to a display driver IC, a display brightness control signal transmitted from the host to the display driver IC, and temperature information of the display device detected from a temperature sensor, and (II) in case a present power value due to a driving of the display device is greater than the allowable power value, in order to control the present power value to be less than or equal to the allowable power value, performs at least one of (i) a 1-st driving current control sub-process of reducing a 1-st bias current supplied to a display panel of the display device to a 2-nd bias current corresponding to the allowable power value through the bias current controller, (ii) a 2-nd driving current control sub-process of reducing an on-duty time of a PWM (Pulse Width Modulation) for driving LEDs of the display panel through the control signal generator, and (iii) a 3-rd driving current control sub-process of performing at least one of BC (Brightness Control) and ACL (Auto Current Limitation) which correspond to the video data through the image processing unit.

10. The display driver IC of claim 9, wherein the display power controller reduces the 1-st bias current to the 2-nd bias current through the 1-st driving current sub-process, and after a preset time, while the 2-nd bias current is increased to a 3-rd bias current lower than the 1-st bias current, the display power controller reduces a driving current of the display device in a stepwise manner through at least one of the 2-nd driving current control sub-process and the 3-rd driving current control sub-process for each predetermined period, to thereby control the present power value to be less than or equal to the allowable power value.

11. The display driver IC of claim 10, wherein, while the 2-nd bias current is increased to the 3-rd bias current, if the present power value does not become less than or equal to the allowable power value as a result of reducing the driving current of the display device in the stepwise manner by reducing the on-duty time of the PWM through the 2-nd driving current control sub-process during a 1-st period to a p-th period, the display power controller performs at least one of the BC and the ACL through the 3-rd driving current control sub-process during a (p+1)-th period to a q-th period, to thereby reduce the driving current of the display device in the stepwise manner, wherein p is an integer greater than or equal to 1 and q is an integer greater than or equal to (p+1).

12. The display driver IC of claim 9, wherein the display power controller reduces the on-duty time of the PWM by dividing one on-duty section of the PWM into a plurality of on-duty sections in performing the 2-nd driving current control sub-process.

13. The display driver IC of claim 9, wherein the display power controller controls a global bias current commonly supplied to every pixel of the display panel, controls each of sub-pixel bias currents supplied to each of R/G/B sub-pixels in each of the pixels, or controls a specific bias current supplied to specific pixels corresponding to a specific region of the display panel, in performing the 1-st driving current control sub-process.

14. The display driver IC of claim 13, wherein, in case of controlling the specific bias current supplied to the specific pixels corresponding to the specific region of the display panel, the display power controller analyzes the video data, to thereby reduce a 1-st specific bias current supplied to 1-st specific pixels in a present frame image, wherein the 1-st specific pixels have same pixel values as those in a previous frame image, and maintain or increase a 2-nd specific bias current supplied to 2-nd specific pixels in the present frame image, wherein the 2-nd specific pixels have different pixel values from those in the previous frame image.

15. The display driver IC of claim 9, wherein the display power controller reduces the 1-st bias current to the 2-nd bias current by using a preset unit current value in the stepwise manner, wherein reducing the 1-st bias current to the 2-nd bias current in the stepwise manner is a result of applying each of weights according to differences between a present temperature of the display device and a target temperature of the display device to the unit current value at each step in the stepwise manner, in performing the 1-st driving current control sub-process.

* * * * *